A. D. GABBERT.
ROAD GUIDE AND TRAVEL INDICATOR FOR AUTOMOBILES.
APPLICATION FILED JUNE 21, 1919. RENEWED JAN. 21, 1922.
1,408,352.
Patented Feb. 28, 1922.
4 SHEETS—SHEET 3.
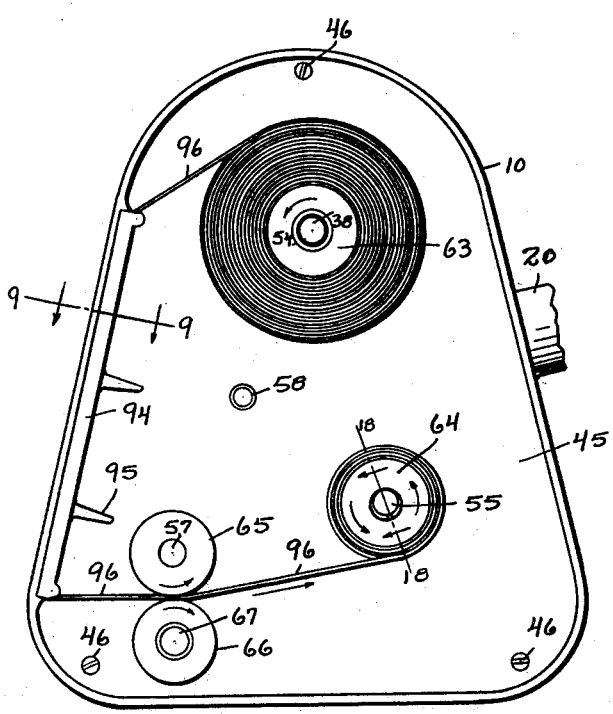
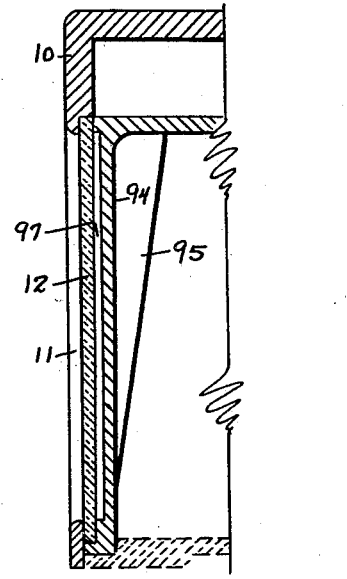
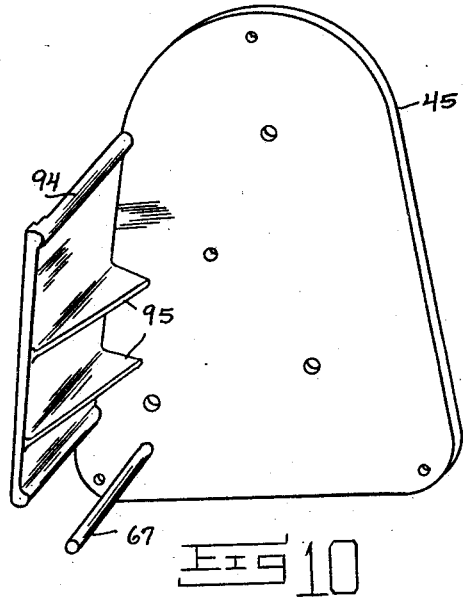
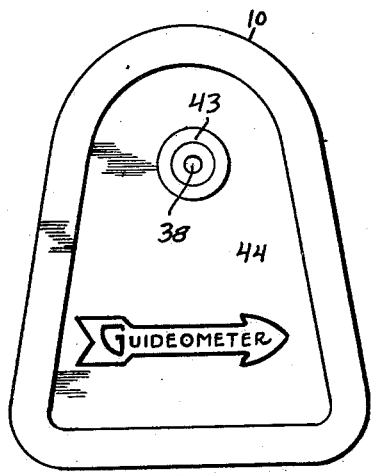
INVENTOR
Archie D. Gabbert
BY *L. L. Westfall*
ATTORNEY

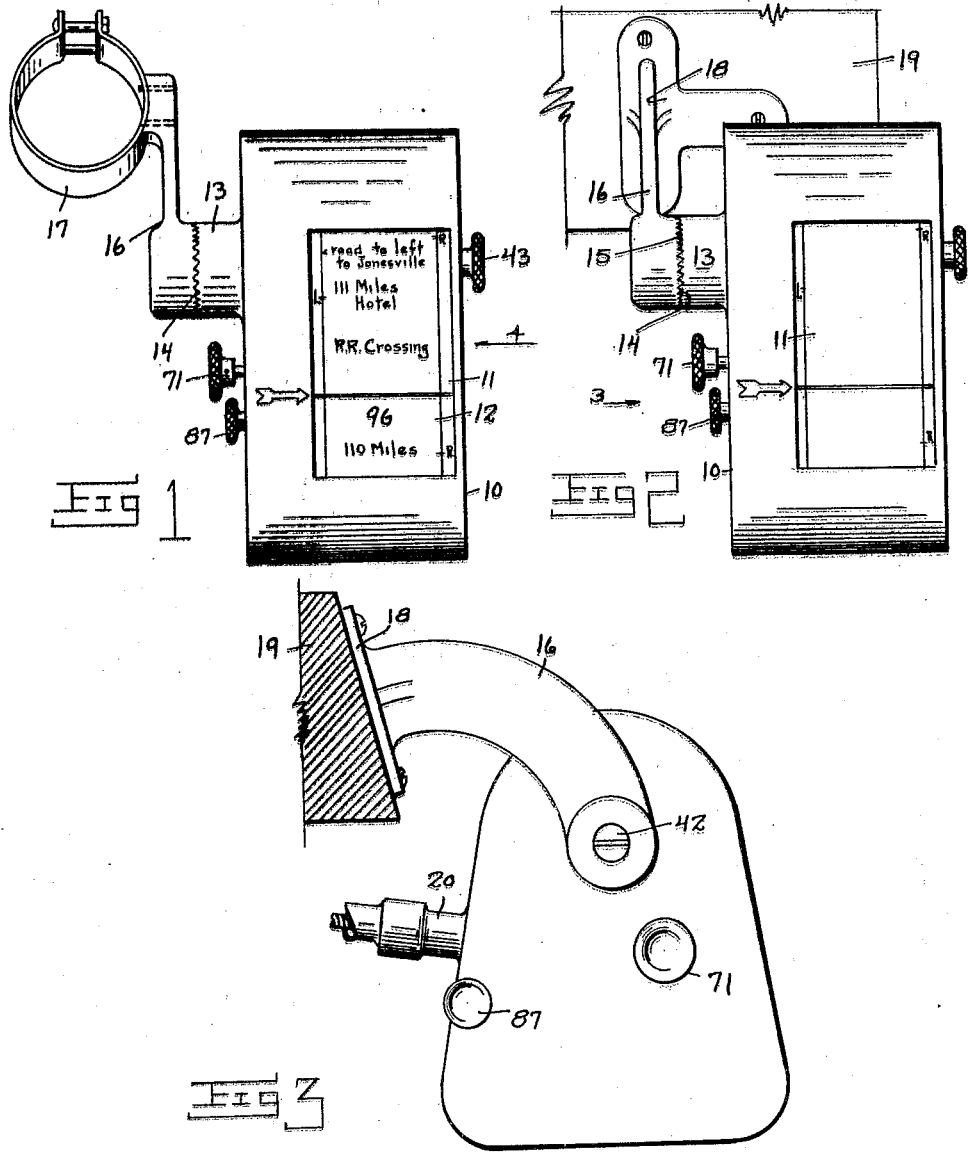

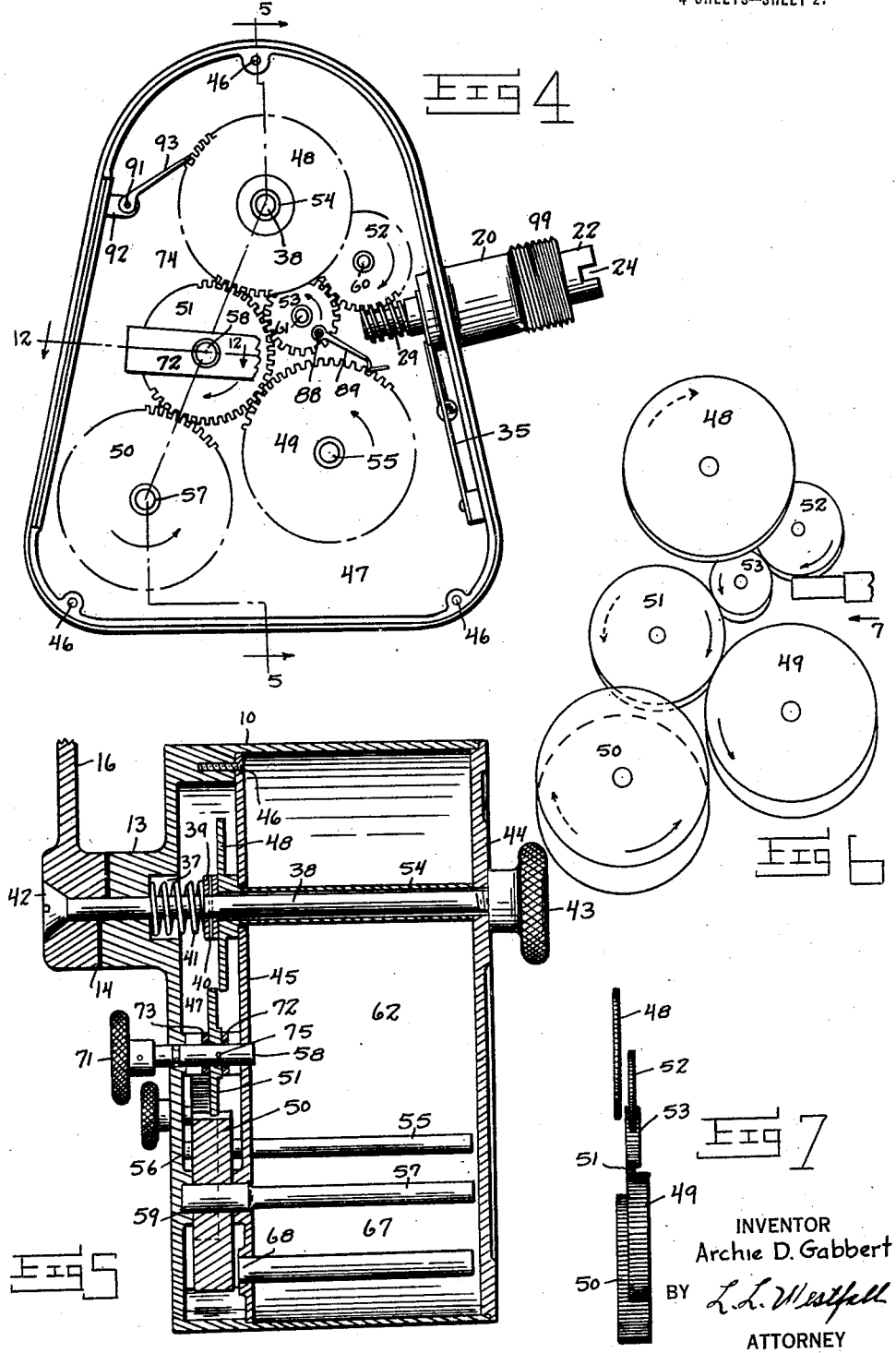

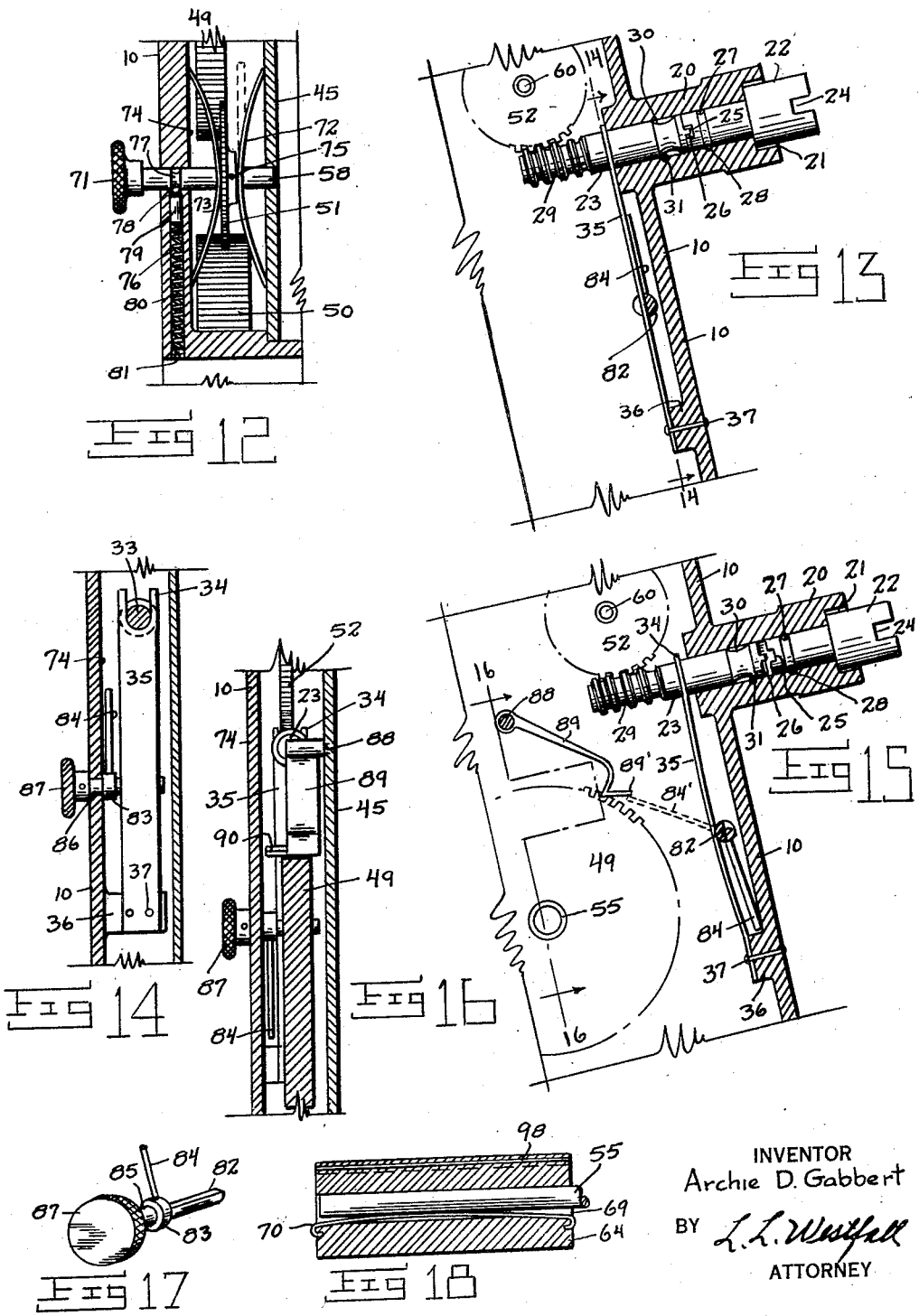

UNITED STATES PATENT OFFICE.

ARCHIE D. GABBERT, OF SPOKANE, WASHINGTON.

ROAD GUIDE AND TRAVEL INDICATOR FOR AUTOMOBILES.

1,408,352. Specification of Letters Patent. Patented Feb. 28, 1922.

Application filed June 21, 1919, Serial No. 305,901. Renewed January 21, 1922. Serial No. 531,002.

*To all whom it may concern:*

Be it known that I, ARCHIE D. GABBERT, a citizen of the United States of America, residing at Spokane, in the county of Spokane and State of Washington, have invented new and useful Improvements in Road Guides and Travel Indicators for Automobiles, of which the following is a specification.

This invention pertains to automobile attachments, and particularly to means for indicating to the driver of the car, successive locations at which the car arrives and indicating the incidental features of the country through which and along the road which the automobile passes, branch roads, garages, gasoline stations, bridges, danger spots, etc. The invention includes the general plan of devices of this character, in which an indicating ribbon containing the data heretofore referred to is caused to travel across an observation opening in a casing containing a portion of the mechanism, in correspondence with the speed of the machine. A special object is to so mount and provide for the automatic feeding of the ribbon, that the same will pass across the observation opening at a speed uniformly with the speed of the car. Another object is to provide automatic means for throwing the ribbon rotation mechanism out of gear when the car starts backward and back into gear when it starts forward again. A further object is to provide means for manually throwing said rotating mechanism in and out of gear, useful in making side trips not on the ribboned route. The device is adapted to be connected with the rotating mechanism of the speedometer of the car and geared down to a workable speed. Other and further objects will be disclosed by the detail description hereinafter contained and by the accompanying drawings forming a part of this specification and in which, Figure 1, is a front view of the device showing a manner of securing the same to the sleeve of the shaft of the steering wheel.

Figure 2, is a like view showing a manner of securing the same to the dashboard of the car.

Figure 3, is a side view of the same, showing broken-away connection with the dashboard of the car and with the speedometer of the same, looking in the direction of the arrow 3, Figure 2.

Figure 4, is a side view of the device with a portion of the casing removed, showing the gearing and connection for speedometer.

Figure 5, is a sectional view taken on the line 5—5 of Figure 4.

Figure 6, is a diagrammatic side view of the gearing of the device.

Figure 7, is an end view of the gearing looking in the direction of the "arrow 7," Figure 6.

Figure 8, is a side view of the device opposite that shown in Figure 4, with a portion of the casing removed.

Figure 9, is a sectional view taken on the line 9—9 of Figure 8.

Figure 10, is a view of the inside of one of the plates of the casing and of the plate for supporting the ribbon in front of the observation opening.

Figure 11, is a view of the outside of the same.

Figure 12, is a sectional view taken on the line 12—12 of Figure 4.

Figure 13 is an enlarged broken-away sectional view showing the manner of connection with the rotating mechanism of a speedometer and showing the device in gear.

Figure 14, is a sectional view taken on the line 14—14 of Figure 13.

Figure 15, is an enlarged sectional view similar to Figure 13, showing the device out of gear.

Figure 16, is a sectional view taken on the line 16—16 of Figure 15.

Figure 17, is a detail view of a key for manually throwing the mechanism out of gear, and, Figure 18, is a sectional view taken on the line 18—18 of Figure 8.

In a detail description in which like numerals refer to like parts throughout the several views, a casing 10 has an observation opening 11 therein in which is mounted a transparency 12. The casing 10 has a side extension 13 with a serrated end 14 adapted for engagement with a serrated end 15 of an arm 16 as a means of attachment to a location on the car. In Figure 1, the arm 16 is attached to a band 17 adapted for engaging the sleeve of the shaft of the steering wheel, while in Figure 2, the arm 16 is provided with a plate 18 for attachment to the dashboard 19 of the car. The casing 10 has also an extension 20 bored out to form an opening 21 in which opening is mounted a stud 22 and a shaft 23, both adapted to rotate.

The stud 22 has an external slot 24 for connection with a speedometer, a groove 25 for connection with a tongue 26 on the end of the shaft 23, and a periphial groove 27 into which extends a pin 28 for holding the stud in permanent position as shown in Figures 13 and 15. The shaft 23 carries a worm gear 29 on the end extending into the casing 10, a wide peripheral groove 30 into which extends a pin 31 and a tongue 26 on the end within the opening 21 adapted for engagement with the groove 25 on the end of the stud 22. The shaft 23 also has a peripheral groove 33 into which extends the U end 34 of a tension spring 35 supported on the inner side of the casing by an inner extending lug 36 by means of a rivet 37. The extension 13 is socketed as shown in Figure 5. A bolt 38 extends transversely through the casing 10, the extension 13 and the end of the arm 16. A collar 39 is made rigid and stationary with the bolt 38 by means of a pin 40. A coil spring 41 encircles the bolt 38 between the collar 39 and the extension 13. The head 42 of the bolt 38 has a bearing within the arm 16 and the opposite end of the bolt has threaded therein a knurled nut 43. The bolt 38 serves to hold the casing 10 rigid with the arm 16 and the nut 43 serves the additional purpose of retaining the cover 44 of the casing 10 in position. The coil spring 40 permits of the manual adjustment and re-adjustment of the casing 10 with the arm 16 and at the same time offers sufficient resistance to hold the serrated edges referred to in engagement with each other to normally form a rigid connection. Extending longitudinally across the casing 10 is a plate 45 held in position by means of screws 46. Within the space 47 between the outer wall of the casing 10 and the plate 45 are rotatably mounted gears 48, 49, 50, 51, 52 and 53. The gear 48 is mounted upon a hollow shaft 54 having its bearing on the shaft 38. The gear 49 is mounted on a shaft 55 having bearings in the plate 45 and in the wall of the casing 10 at 56. The gear 50 is mounted on a shaft 57 having its bearings in the plate 45 and the outer wall of the casing 10 at 59. The gear 51 is mounted on a shaft 58 having its bearings in the plate 45 and the outer wall of the casing 10. The gear 52 is mounted on a shaft 60 having its bearings in the plate 45 and the outer wall of the casing 10 and the gear 53 is mounted on a shaft 61 having its bearings in the plate 45 and the outer wall of the casing 10. Within the space 62 are mountings as follows: A spool 63 upon the hollow shaft 54, a spool 64 upon the shaft 55, a soft rubber roller 65 upon the shaft 57 and a hard friction roller 66 upon a shaft 67 having a fixed mounting in the plate 45 at 68. The spool 63 has a loose mounting upon the shaft 54, the opening 69 through the spool being large enough to permit of the installing therein of a tension spring 70 which bears against the shaft 54 thereby giving the spool a frictional engagement with the shaft. The spool 64 is mounted upon the shaft 55 in the same manner. The shaft 58 carries an exposed knurled head 71. A tension spring 72 is engaged at its center by the shaft 58 and has its ends bearing against the plate 45. A tension spring 73 is engaged at its center by the shaft 58 and has its ends bearing against the wall 74 of the casing 10. The gear 51 is rigidly secured to the shaft 58 by means of a pin 75 passing through the hub of the gear and through the shaft 58, the gear 51 occupying a position on said shaft between said springs. An opening 76 is made in the wall 74 of the casing 10 extending from the periphery of the casing 10 to the shaft 58. An annular groove 77 is made in the periphery of the shaft 58. A ball 78 is dropped into the opening 76 and engages the groove 77. A follower 79 is then dropped into the opening 76 and on top of that is placed a coil spring 80. A plug 81 then closes the opening 76 holding the spring 80 in a compressed position. Mounted or bearing against the spring 35 is a cam 82 carrying a collar 83 in which is mounted a pin 84 extending at right angles to the cam. The cam has a bearing surface 85 engaging an opening 86 in the wall 74 of the casing 10. To the outer end of such bearing is attached a knurled head 87. Rotatably mounted on a pin 88 on the plate 45 is a pawl 89 normally engaging the gear 49 and having a sidewise extension 90 reaching beyond and to one side of the gear 49. Rotatably mounted on a pin 91 in a stud 92 reaching from the wall 74 of the casing 10 is a pawl 93 normally engaging the gear 48. Extending at right angles from the plate 45 is a plate 94 supported by ribs 95 which in the assembly of the parts sets to the rear of the transparency 12 and serves as a guide and support for the indicating ribbon 96 which passes through a space 97 between the transparency 12 and the plate 94.

In the practical application of the device, the same is mounted on a car in the vicinity of the speedometer and in plain view of the driver, either as is provided for in Figure 1, or on the dash-board as is provided for in Figures 2 and 3. The indicating ribbon 76 covering the route to be traveled is placed upon the spool 63, the inner end being fastened as in the groove 98 of the spool, the outer end being carried through the opening 97 back of the transparency 12 and in front of the guide plate 94, thence between the rollers 65 and 66 and secured to the spool 64 in the manner shown in Figure 8. A cable connected with the speedometer cable of the car is connected to the extension 20 by means of a threaded union 99, a tongue on the cable connecting with the groove 24. It is understood that the tongue and groove of the members 22 and 23 are normally engaged, that the worn gear 29 engages the gear 52, the gear 52 engages the gear 53, the gear 53 engages the gear 51, and the gear 51 engages the gears 50 and 49. It is further understood that reductions by gears not herein shown together with reductions by means of the gears shown cuts down the speed of the speedometer cable in so far as it affects this mechanism to two inches of the indicating ribbon 96 to one mile of travel, to which adjustment the indications on the ribbon are arranged. It is further understood that the diameter of the roller 65 in order to obtain the above named results must be ⅜ of an inch in diameter and that an increase in the diameter of such roller would increase the inch passage of the ribbon in proportion. Inasmuch as the diameter of the spool 63 and the supply ribbon 96 is constantly decreasing and the diameter of the spool 64 and ribbon 96 is increasing, some means of providing a uniform movement of the ribbon must be made. This is provided for by the soft rubber roller 65 and the hard roller 66 between which rollers the ribbon passes from the spool 63 to the spool 64. The hard roller 66 holds the ribbon against the soft roller 65 which governs the feed. The spool 63 having a frictional engagement with the shaft 54 by reason of the spring 70 is permitted to slip to meet the uniform feed provided by the rollers 65 and 66, likewise the spool 64 upon the shaft 55. When the car is backed up, either the pawl 89 or 93, dependent on the adjustment of wheel 51, will prevent the initial gear wheel 52, from being rotated opposite to the direction indicated by the arrow in Figure 4. Consequently, the worm 29, turning in mesh with stationary wheel 52, will cause a longitudinal movement of worm spindle section 23 endwise out of clutch with the driving clutch spindle section 22, against the action of spring 35. Thus it may be stated that section 23, worm screws itself endwise out of clutch with section 22. The extent to which the clutch ends 25 and 26 are separated is so minute that immediately after backing up movement of the auto has ceased and forward movement or drive has started, the back-lash or free play of the gears will be sufficient to permit the spring 35 to restore section 23, a sufficient distance to just engage the clutch members 25 and 26. Whereupon, further forward drive will result in full engagement of said members. The rotable parts normally rotate in the direction of the arrows where indicated. Means for manually disengaging the tongue and groove connection 25 and 26 to throw the device out of gear are provided, which is by means of the cam 82 normally resting in the position shown in Figure 13, and which is operated to disengage said tongue and groove by turning the knurled head 87 attached to the cam 82 which turns the cam to the position shown in Figure 15, thereby causing the spring 35 to fall inwardly on the shaft 23 and to disengage said tongue and groove. In the change of the position of said cam, the pin 84 is rotated to the position of the dotted lines 84' (Figure 15) bending the end 89' of the pawl 89 to get past the same and then passing to the position shown in Figure 15. In order to re-engage the parts it is only necessary to reverse the movement of the knurled head 87 to turn the cam back to the position shown in Figure 13. In order to release the gears to back action to permit the tongue and groove 25 and 26 to re-engage, the pin 84 raises the pawl 89 in its return path in the changed position of the cam from that shown in Figure 15 to that shown in Figure 13. Referring now to Figure 12, the parts as therein shown are in relative normal position. A pressing in of the shaft 58 by manual force on the knurled head 71 compresses the spring 72 and shifts the gear 51 from engagement with the gears 49 and 53 and to engagement with the gear 48 which is the gear on the shaft 54 that carries the spool 63. This puts the unwinding spool 63 and the winding spool 64 in engagement with the gear 51 and by the turning of the knurled head 71 on the end of the shaft 58 the ribbon 96 may be re-wound on the spool 63 either for readjustment purposes or for a repeated route. By manually pulling outwardly on the knurled head 71 the spring 73 bearing on the shaft 58 is compressed and the gear 51 is thrown out of engagement with the gear 53 and only engages the gears 49 and 50 whereby, by manually turning the knurled head 71 of the shaft 58, the ribbon 96 is advanced onto the spool 64 for readjustment or other purposes. It is understood that the ball 78 bearing in the groove 77 of the shaft 58 serves to hold the shaft 58 in the position shown in Figure 12, and that a manual pull or push on the knurled head 71 will release the same as against said ball and the pressure of the spring 80. The springs 72 and 73 assist in snapping the shaft 58 to the position shown in Figure 12 when released from another position.

What is claimed is:—

1. In a road guide and travel indicator for automobiles, a casing, tape winding and unwinding spools mounted in said casing, a travel guide tape having its end portions wound about said spools, an advancing means for said tape between said spools comprising hard and soft rollers with the hard roller at least as large in diameter as the soft roll and said rollers engaging the tape on opposite sides thereof, said rollers being rotatable about fixed axes whereby pressure of the hard roller against the soft roller will restrict the active radius of the soft roller to a uniform dimension, and means for driving the soft roller thereby causing the constant or uniform active radius of the latter to impart a uniform rate of advancing movement to the tape.

2. In a road guide and travel indicator for automobiles, a casing, tape winding and unwinding spools mounted in said casing, a travel guide tape having its end portions wound about said spools, an advancing means for said tape between said spools comprising hard and soft rollers and said rollers engaging the tape on opposite sides thereof, said rollers being rotatable about axes fixed with respect to each other whereby pressure of the hard roller against the soft roller will restrict the active radius of the soft roller to a uniform dimension, and means for driving the soft roller thereby causing the constant or uniform active radius of the latter to impart a uniform rate of advancing movement to the tape.

3. In a road guide and travel indicator for automobiles, a casing, tape winding and unwinding spools in said casing, advancing means for said tape between said spools, a driving gear train in driving connection with said spools and including an initial worm wheel, a worm clutch spindle section having a worm meshing with said worm wheel, a driving clutch spindle section for end-wise clutch engagement with said worm clutch section and the latter being longitudinally movable into and out of clutch engagement with the former, and means for preventing backward movement of the gear train when the automobile is backed up, whereby backward drive of the automobile will cause said worm spindle section to worm-screw itself end-wise out of clutch with said driving spindle section.

4. In a road guide and travel indicator for automobiles, a casing, tape winding and unwinding mechanism in said casing, a driving gear train for said mechanism including a worm wheel, a worm clutch spindle section having a worm meshing with said worm wheel, a driving clutch spindle section for end-wise clutch engagement with said worm clutch section and the latter being longitudinally movable into and out of clutch engagment with the former, and means for preventing backward movement of the gear train when the automobile is backed up, whereby backward drive of the automobile will cause the worm spindle section to worm-screw itself end-wise out of clutch with said driving spindle section.

5. In a road guide and travel indicator for automobiles, a casing, winding and unwinding spools in said casing, a travel guide tape having its end wound on said spools, positively acting advancing means engaging said tape between said spools, a gear train positively driving said means and being in constant drive therewith and having slip drive connection with both of said spools, and one element of said gear train being manually adjustable to connect or disconnect either of said spools into or out of drive without disconnecting said means from drive for manual actuation of either spool to manually advance the tape in either of two directions whereby the tape may be used as a finder, said means always being in driving connection with said train whereby said means will positively advance the tape in either direction either during manual adjustment or during automobile drive of the device.

6. In a road guide and travel indicator for automobiles, a casing, tape winding and unwinding spools in said casing, advancing means for said spools, a driving gear train in driving connection with said spools having a worm wheel, a worm clutch spindle section having a worm meshing with said worm wheel, a driving clutch spindle section for end-wise clutch engagement with said worm clutch section, and the latter being longitudinally movable into and out of clutch engagement with the former, a spring normally acting to engage the worm section into clutch with the driving section, and manual means for engaging said spring to shift said worm section out of clutch with said driving section.

7. In a road guide and travel indicator for automobiles, a casing, tape winding and unwinding spools in said casing, advancing means for said spools, a driving gear train in driving connection with said spools having a worm wheel, a pawl engaging one element of said train to prevent backward movement of the train, a worm clutch spindle section having a worm meshing with said worm wheel, a driving clutch spindle section for end-wise clutch engagement with said worm clutch section, and the latter being longitudinally movable into and out of clutch engagement with the former, a spring normally acting to engage the worm section into clutch with the driving section, and manual means for disengaging said pawl and engaging said spring to shift said worm section out of clutch with said driving section.

In testimony whereof, I affix my signature in presence of two witnesses.

ARCHIE D. GABBERT.

Witnesses:
JOSEPH MCCARTHY.
L. L. WESTFALL.